United States Patent [19]

Slemmer

[11] Patent Number: 5,277,394
[45] Date of Patent: Jan. 11, 1994

[54] COAXIAL ISOLATOR DEVICE

[76] Inventor: Arlo Slemmer, 639 Bergey Rd., Telford, Pa. 18969

[21] Appl. No.: 970,018

[22] Filed: Nov. 2, 1992

[51] Int. Cl.⁵ .............................................. F16L 3/00
[52] U.S. Cl. ................................... 248/570; 248/626; 248/610; 248/602; 267/166
[58] Field of Search ............... 248/626, 610, 613, 625, 248/602, 618, 601, 570; 267/166

[56] References Cited

U.S. PATENT DOCUMENTS

| | | | |
|---|---|---|---|
| 1,453,992 | 5/1923 | Palin | 248/601 |
| 3,023,993 | 3/1962 | Kerley, Jr. | |
| 3,031,163 | 4/1962 | Kerley, Jr. | |
| 3,057,593 | 10/1962 | Kerley, Jr. | |
| 3,074,681 | 1/1963 | Kerley, Jr. | |
| 3,086,600 | 4/1963 | Kerley, Jr. | |
| 3,204,943 | 9/1965 | Kerley, Jr. | |
| 3,596,865 | 8/1971 | Camossi | 248/570 X |
| 3,744,746 | 7/1973 | Weir et al. | 248/613 X |
| 4,057,237 | 11/1977 | Nemeth | 248/569 X |
| 4,397,069 | 8/1983 | Camossi | |
| 4,586,689 | 5/1986 | Lantero | |
| 4,783,038 | 11/1988 | Gilbert et al. | 248/570 |
| 4,854,556 | 8/1989 | Pietrzak | 248/570 X |
| 5,037,060 | 8/1991 | Yalvac | 248/580 X |
| 5,062,507 | 11/1991 | Roche | 267/148 X |

FOREIGN PATENT DOCUMENTS

| | | | |
|---|---|---|---|
| 0059143 | 9/1982 | European Pat. Off. | 248/610 |
| 0116524 | 10/1978 | Japan | 248/610 |
| 8808933 | 11/1988 | World Int. Prop. O. | 267/166 |

OTHER PUBLICATIONS

ABB Impell Corp., "Controlling Pipe Vibration Using Wire Energy Absorbing Rope Pipe Restraints", Jun., 1991.

*Primary Examiner*—Karen J. Chotkowski
*Attorney, Agent, or Firm*—Schweitzer Cornman & Gross

[57] ABSTRACT

A coaxial isolator provides for damping in a longitudinal direction. A pair of elongated frame elements have a shockabsorbing element mounted therebetween. The first frame element is provided with a central aperture into which a central pedestal formed in the second element projects. The pedestal is supported by a rod which is mounted in bores through the aperture walls and which extend through one end of the first frame element. The rod may serve as a first point of attachment, while the opposed end of the first frame element serves as the second end of attachment. The isolators may be ganged in series to provide appropriate response curves.

6 Claims, 4 Drawing Sheets

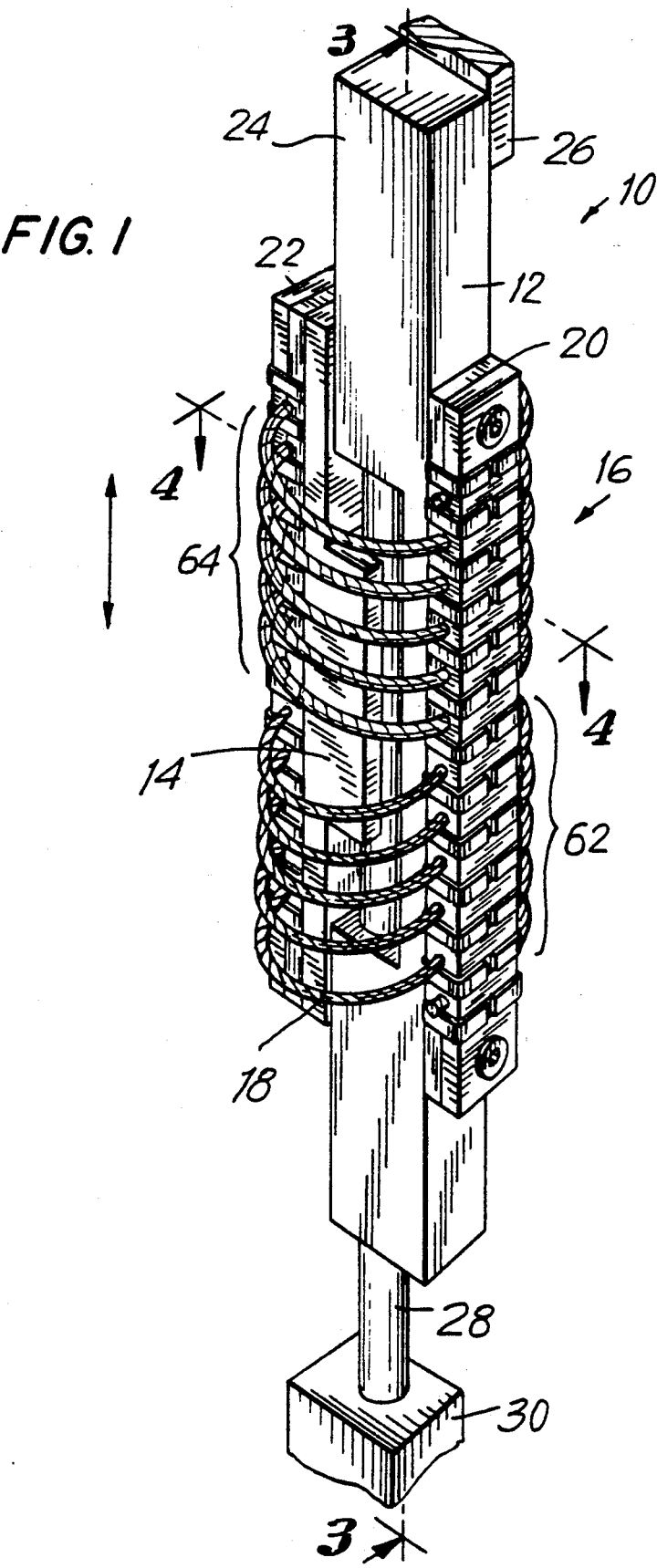

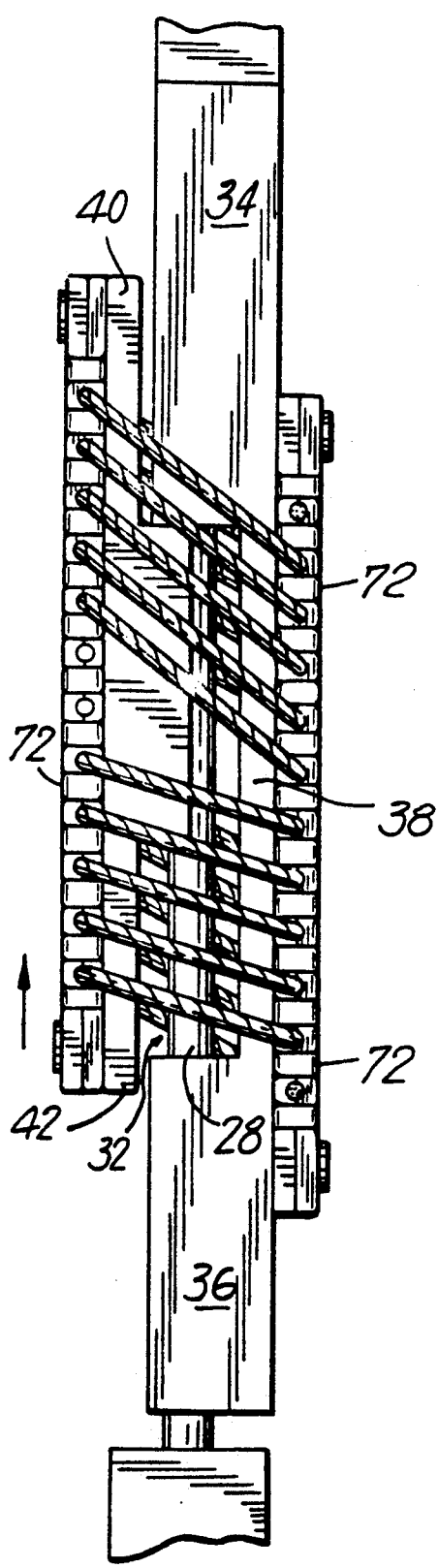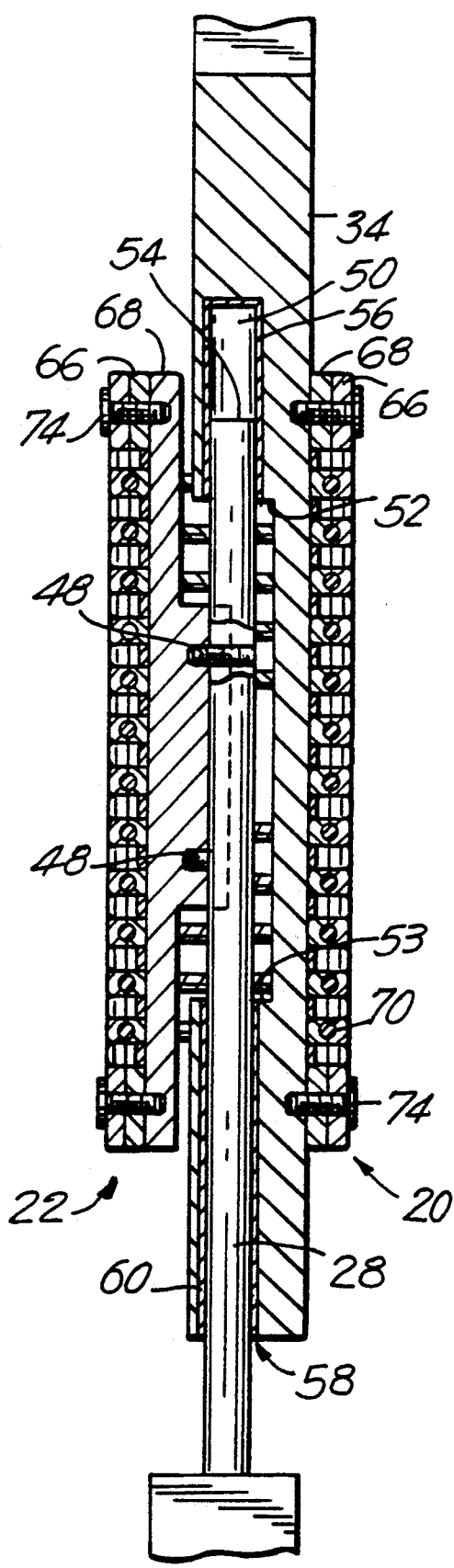

COAXIAL ISOLATOR DEVICE

The present invention relates to isolators and, in particular, to isolators specifically designed and adapted for damping and isolation along a single axis.

BACKGROUND OF THE INVENTION

In large scale process plants, power generation plants, and similar facilities substantial piping is utilized. Often, due to pressure variations, turbulences, seismic activity and other instabilities, such pipes are subjected to stress and vibration. These vibrations can be transferred to the supporting structures through the piping mounts. It is advantageous to damp or arrest such stresses and displacements to avoid the deterioration and damage which could otherwise result. In addition, the transfer of such piping vibration to the primary structure, even if not damaging, can be annoying to personnel.

It is a purpose of the present invention to provide an isolator device to damp vibration, and especially vibration generated by piping and the like.

A further purpose of the present invention is to provide an isolator device which has response limited to one primary axis.

Yet another purpose of the present invention is to provide an isolator device which is of compact construction and which may be manufactured inexpensively and efficiently and with low maintenance.

BRIEF DESCRIPTION OF THE INVENTION

The present invention comprises a pair of frame members between which a flexible stress-absorbing element, such as a plurality of wire rope segments, are affixed. The first frame member is of elongated construction, with a pair of opposed end portions joined by an intermediate connecting portion of decreased thickness forming a longitudinally-directed aperture or opening between the ends. The second frame member is also of elongated construction, with a pair of opposed end portions joined by an intermediate connecting portion of increased thickness forming a longitudinally-extending pedestal. The pedestal mates with the aperture of the intermediate connecting portion of the first frame member.

A supporting member spans the intermediate connecting portion of the first frame member, and is affixed to the pedestal of the second frame member to permit the relative reciprocation of the frame members along the major longitudinal axis of the isolator structure. Shock absorbing elements are mounted between the frame members to provide damping to such reciprocation.

One of the frame elements is affixed to a base structure, while the other element is affixed to the object intended t be isolated.

In an alternative embodiment, a pair of first frame members may be joined and aligned in an end-to-end series relationship, the respective second frame members having appropriate opposed connections at the ends of the series combination for attachment to the load and fixture. Such a structure can provide a response curve having differing characters as the rated load varies. By ganging additional elements, complex response curves can be developed.

BRIEF DESCRIPTION OF THE DRAWINGS

A fuller understanding of the present invention and the features thereof may be obtained upon consideration of the following description of preferred, but nonetheless illustrative, embodiments thereof, when reviewed in conjunction with the annexed Figures, wherein:

FIG. 1 is a perspective view of the invention;

FIG. 2 is an elevation view of the invention taken from a side thereof;

FIG. 3 is a side elevation view in section taken along line 3—3 of FIG. 1;

DETAILED DESCRIPTION OF THE INVENTION

Figure 4:
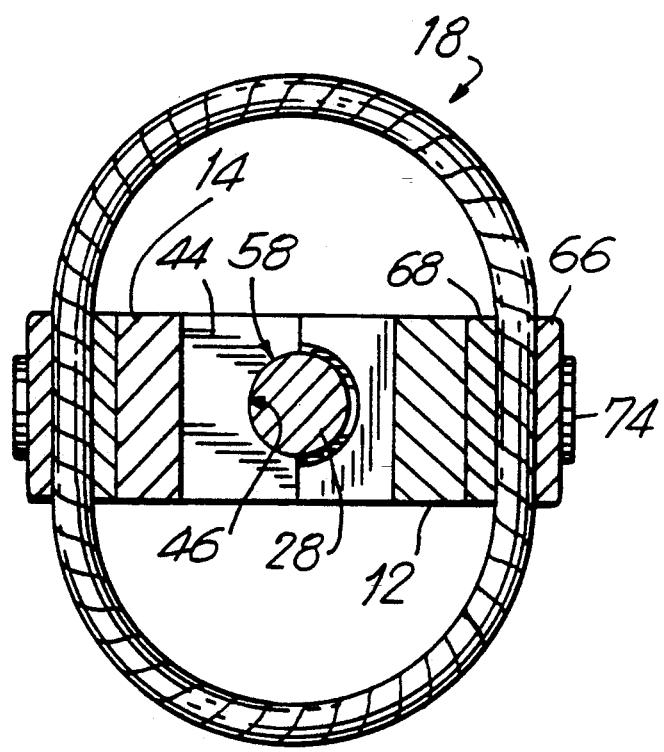
FIG. 4 is a plan view of the invention taken along line 4—4 of FIG. 1.

With reference to FIGS. 1 through 4, an isolator damper 10 of the present invention is comprised of first and second frame elements 12, 14 between which stress-absorbing element 16 is mounted. As shown therein, the stress-absorbing element 16 may comprise a plurality of wire rope segments 18 supported by mounting blocks 20, 22 affixed to the frame elements 12, 14, respectively. First frame element 12 may be affixed at its end 24 to a structure 26, while frame element 14 may be connected through affixed shaft 28 to a load 30 sought to be isolated from structure 26. The load 30 may be, for example, a piping run, whereby the isolator 10 replaces a hanger for the pipe. The precise means of connection between the isolator and supported load, not shown in the figures, is apparent to those skilled in the art. Stresses and displacements along the main longitudinal axis of the isolator, as depicted by the arrow in FIG. 1, are damped by the stress-absorbing element 16, thus providing isolation and shock and vibration damping for the load.

First frame element 12 may be in the form of a rigid bar of rectangular cross-section, having a rectangular recess or notch 32 through a sidewall of the central portion thereof, whereby opposed end sections 34, 36 are joined by intermediate portion 38 of reduced thickness. Second frame element 14 comprises opposed end sections 40, 42 adjoining central pedestal portion 44. With the frame elements placed in a side-by-side relationship, the dimensions of pedestal portion 44 are chosen to permit it to extend into the recess 32 of the first frame element, the reduced length of the pedestal with respect to the length of the recess allowing relative longitudinal reciprocation of the frame elements while defining the limits of such relative motion. While the recess 32 and pedestal 44 are presented as extending fully across the width of the respective frame element it is to be appreciated that alternative construction may be employed whenever the limits of reciprocation can be similarly defined.

Shaft 28 is affixed to pedestal 44. As best seen in FIGS. 3 and 4, the pedestal may bear a longitudinally-extending semicircular recess 46 dimensioned to accept the shaft upon its top surface. The shaft is affixed to the pedestal by appropriate fasteners 48.

To support and maintain the second frame element to permit controlled reciprocating motion, each of the end sections 34, 36 of first frame element 12 is adapted to accept the shaft 28. As best seen in FIG. 3, first end 34 is provided with blind longitudinal bore 50 through interior end wall 52 to accept the end 54 of shaft 28. The bore 50 may be provided with a phosphor bronze or similar lining 56 to serve as a journal for the shaft end, the length of the bore being sufficient to allow a full range of relative travel while maintaining the shaft therein at full extension of the isolator.

Second end 36 of frame element 12 is provided with an aligned throughbore 58 for the shaft 28, extending from interior end 74 through the second end portion, similarly provided with a lining or insert 60. So journaled, shaft 28 supports second frame element 14 with respect to first frame element 12 and permits the relative longitudinal motion therebetween, while eliminating motion along the other orthogonal axes.

Shock and stress absorption is provided by the wire rope segments 18 further joining the two frame elements together. In a preferred embodiment, the segments 18 may be formed from a unitary length of wire rope coiled between the frame elements.

Because the utilization of a single length of rope wound into a helical configuration can produce an asymmetric response, the windings may be divided into first and second groups 62, 64. One group is wound with a clockwise spiral, while the other group is wound with a counterclockwise spiral. In this manner the opposed winding effects are balanced out.

The wire rope elements may be connected to the frames by the grip blocks 20, 22, each of which comprises a pair of rectangular pieces 66, 68 having a plurality of transverse semicircular apertures 70 which, when the pieces are aligned, engage and embrace the wire rope turns, effectively dividing the rope into the segments running between the grip blocks and hence the frames to which they are mounted. A plurality of rigid bands 72 are affixed about the assembled blocks, preferably in transverse grooves, to bind the blocks closely together and to maintain the wire rope turns therein. Winding apparatus, as known in the art, may be utilized for the fabrication of the windings and their affixation to the grip blocks. The completed loop assembly may then be affixed to the frame elements 12 and 14 by the use of bolts or other appropriate fasteners 74.

As may be appreciated, the mounting of second frame element 14 upon shaft 28, which is journaled for axial travel in frame element 12, provides for the absorption and damping of such axial displacements by the wire rope segments 18. Displacements along other perpendicular axes are prevented, thus providing a one-dimensional response particularly effective for the isolation of pipes and the like which are hung from a structure, and which are subject to displacements concentrated along a single axis. Because the supported mass may be mounted directly below the point of attachment of the assembly to the supporting structure, undesirable torques are avoided, the in-line structure providing for effective damping in a device of minimum physical dimensions.

Figure 5:
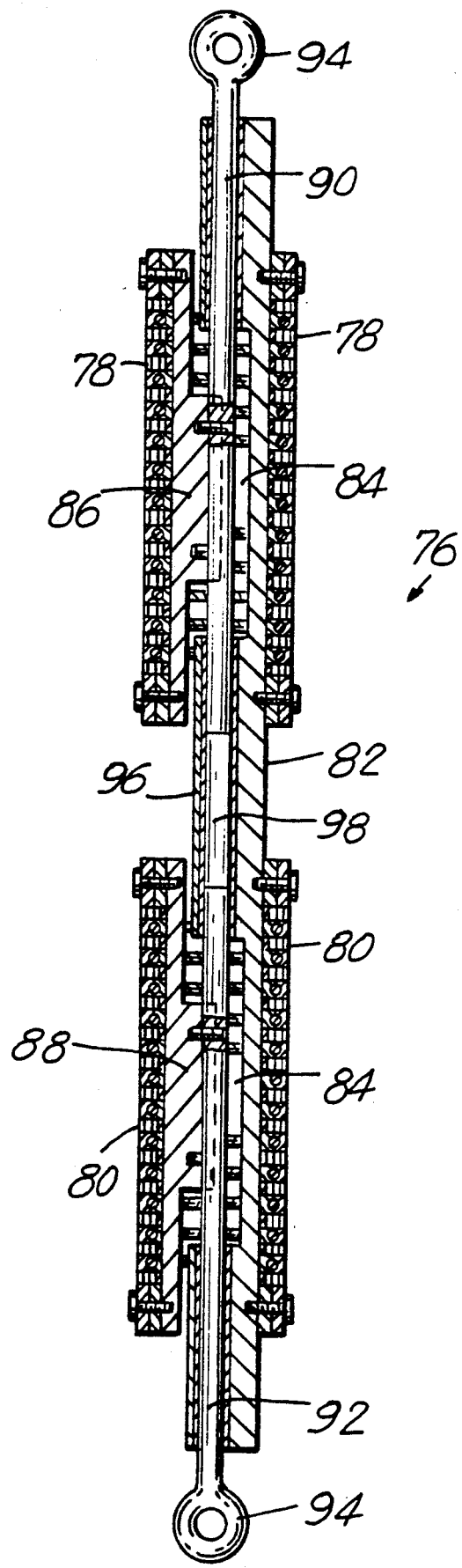
FIG. 5 is a side elevation view in section depicting a series configuration.

As seen in FIG. 5, two or more elements may be joined in a series arrangement to modify the response of the isolator. As depicted therein, the compound isolator 76 has first and second coaxial stress-absorbing wire rope element sets 78, 80. Both element sets are mounted, in a spaced relationship, to the first frame element 82, having notches 84, each accommodating the intermediate pedestal portion of second frame elements 86, 88.

Each of the pedestal portions is itself affixed to one of the shafts 90, 92, which project through the opposed ends of the first frame element 82 and are provided with appropriate terminators, such as the journals 94, for mounting. The central portion 96 of the first frame element is provided with bore 98 to accept the inwardly-facing ends of the shafts, which are in a collinear alignment with each other. The wire rope elements are affixed to the respective second frame elements in the manner previously set forth.

The wire rope element sets 78, 80 may be chosen to have the same or different responses to applied displacements. In general, when they are of different characteristics, smaller displacements will be absorbed by the one element until the fore-displacement product or restoring force exceeds the characteristic response for the second at small displacements. At that point, a combined response occurs, typically providing a smaller deflection for a given load than a comparable single stage isolator. By appropriate choice of wire rope characteristics, the response then can be tailored for specific situations.

I claim:

1. An isolator for damping vibrations along a vibration axis, comprising a first frame element having opposed end portions along said axis, each of said end portions having an inwardly-directed end wall joined by an intermediate section whereby a longitudinally-extending aperture is provided between said end walls; a second frame element having opposed end portions along said axis joined by an intermediate pedestal, means mounted between said end walls in said aperture for affixation of said pedestal thereto for relative reciprocating motion of said frame elements along said axis, vibration absorption means mounted between said first and second frame elements; and mounting means affixed to said first and second frame elements extending generally along said axis.

2. The apparatus of claim 1, wherein said means for affixation of said pedestal comprises a shaft journaled in said opposed end portion of said first frame element.

3. The apparatus of claim 2, wherein said mounting means comprise an end of said shaft projecting from one of said opposed end portions.

4. The apparatus of claim 2, wherein said vibration absorbing means comprise wire rope segments.

5. An isolator for damping vibration along a vibration axis, comprising a first elongated frame element having a sidewall extending longitudinally along said axis between first and second ends; at least one longitudinally-extending recess in said sidewall; at least one second elongated frame element, each of said second elongated frame elements having a longitudinally-extending pedestal adapted and dimensioned to fit within a separate one of said at least one recess; guide means mounted to said first and second frame elements to retain said pedestals within said recesses and to permit relative longitudinal motion between each of said second frame elements and said first frame element along said axis; and vibration-absorption means mounted between each of said second frame elements and said first frame element.

6. The isolator of claim 5 further comprising mounting means located at said first and second ends of said first frame element.

* * * * *